A. J. & W. C. LINDEMANN.
COOKING STOVE.
APPLICATION FILED DEC. 9, 1914.
1,191,978.
Patented July 25, 1916.
5 SHEETS—SHEET 3.
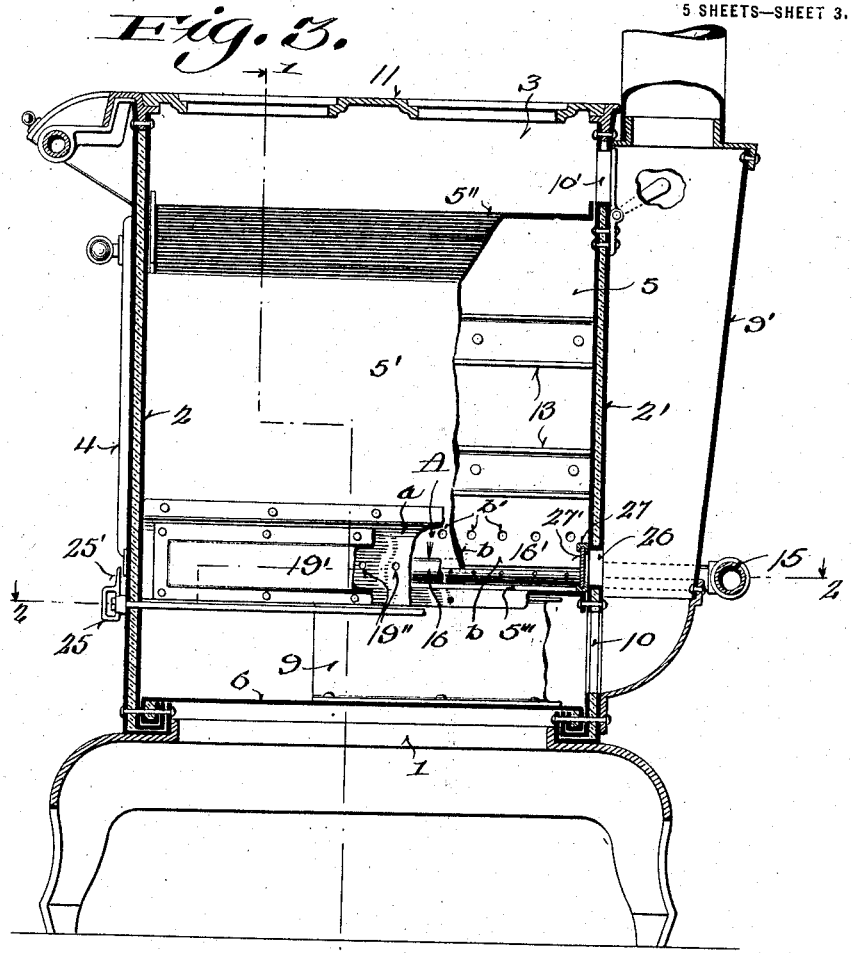
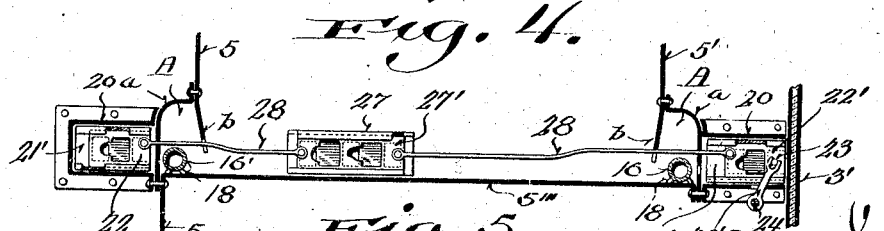

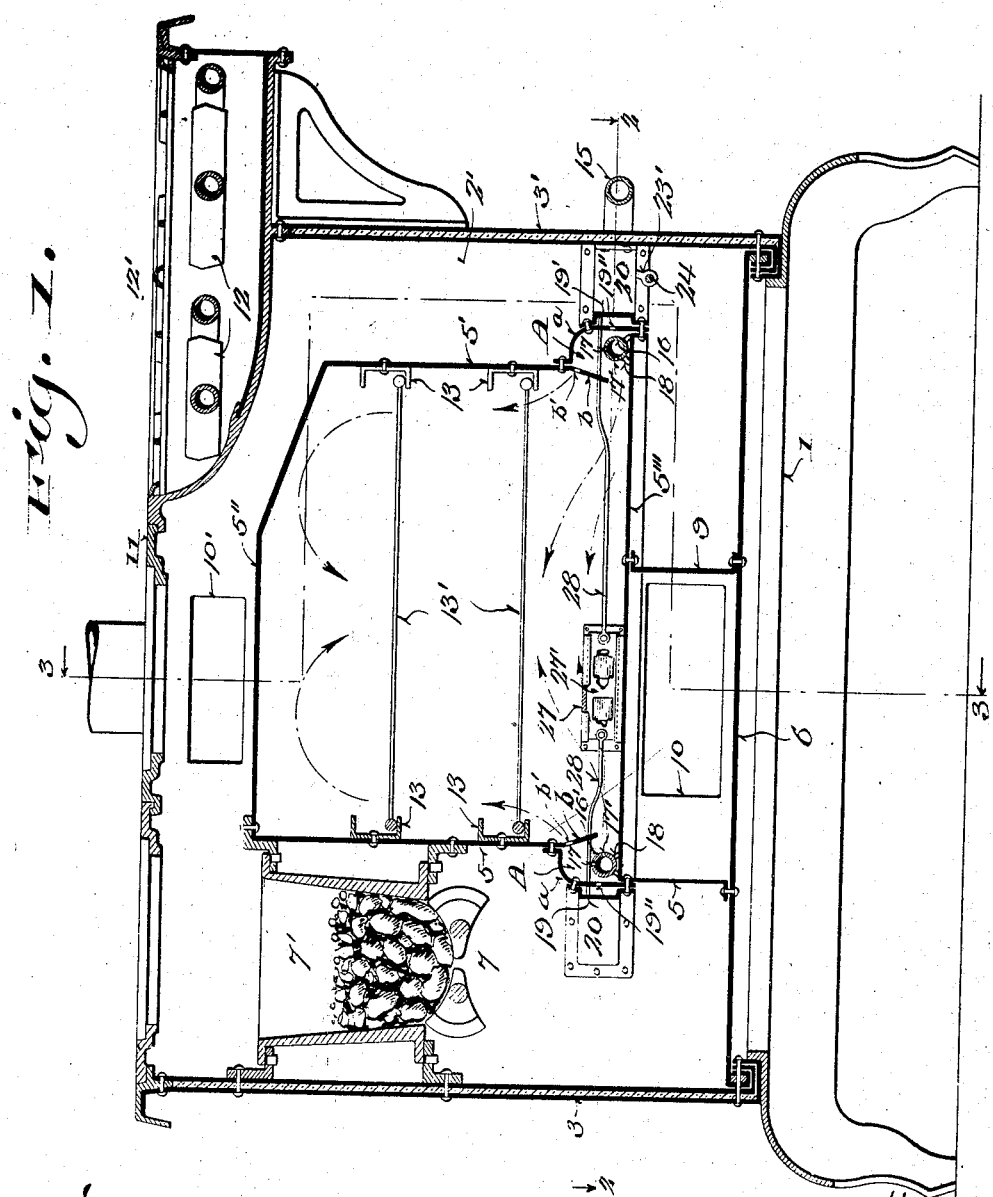

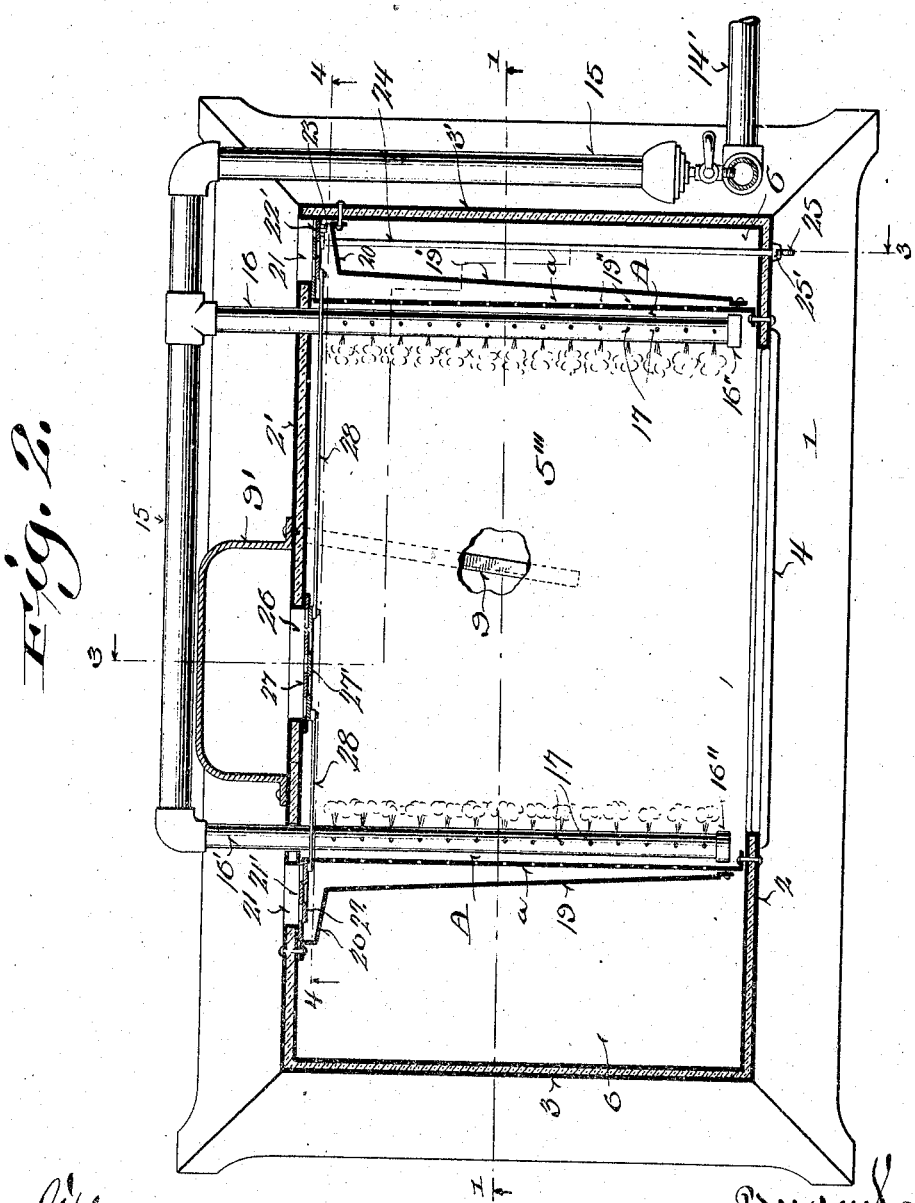

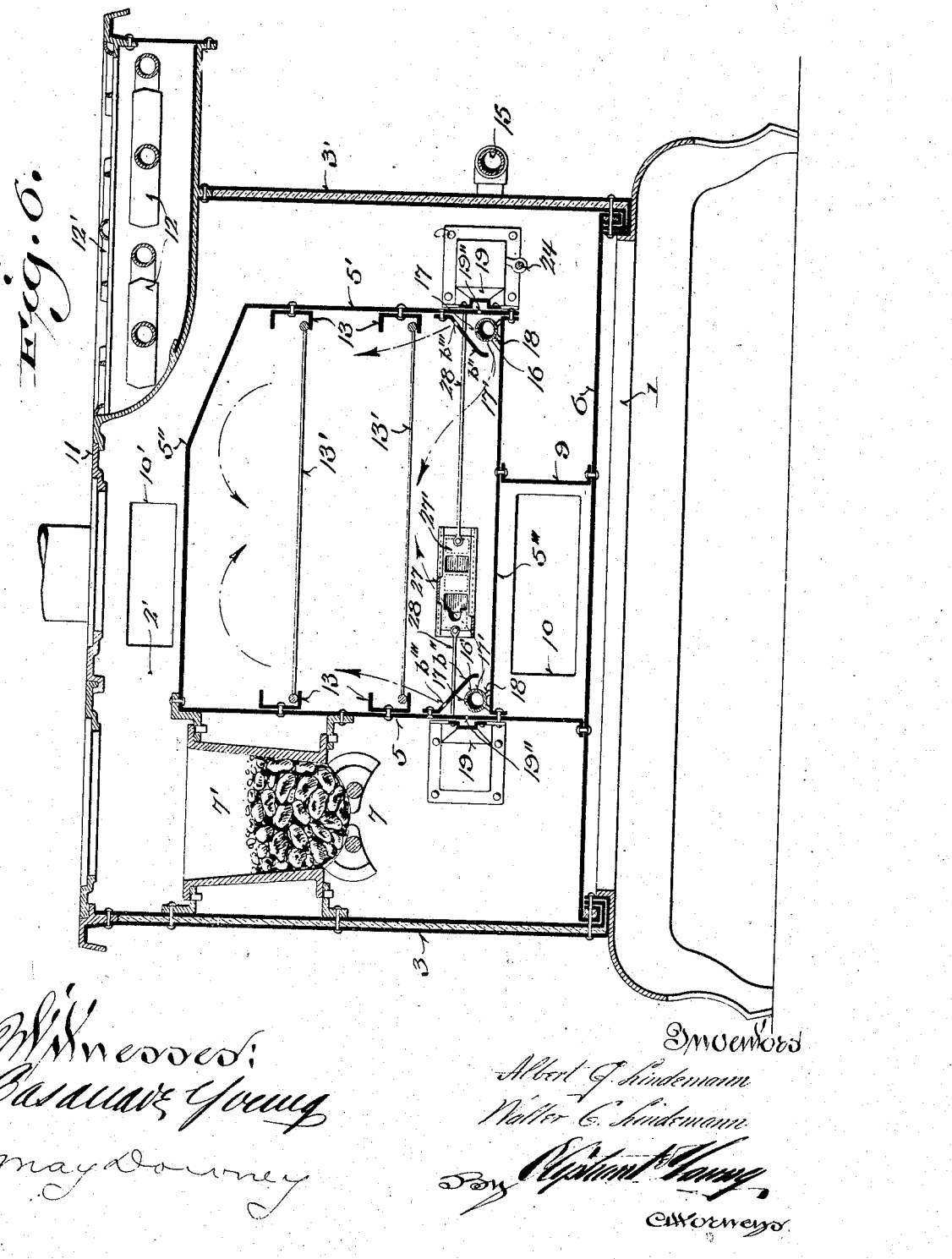

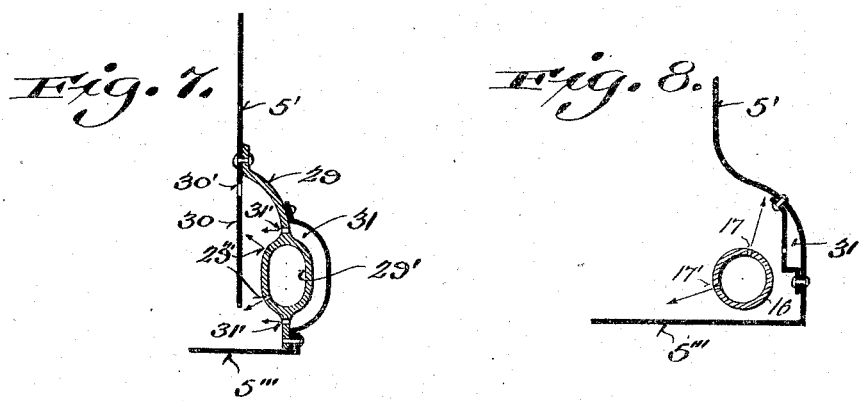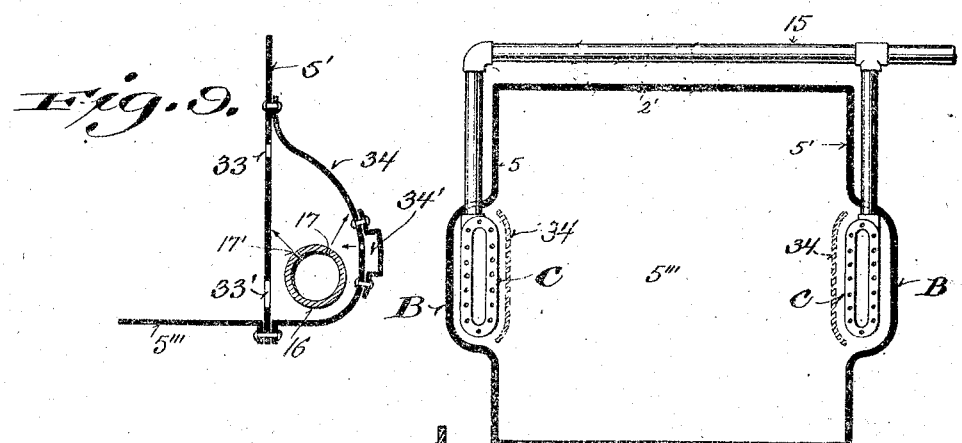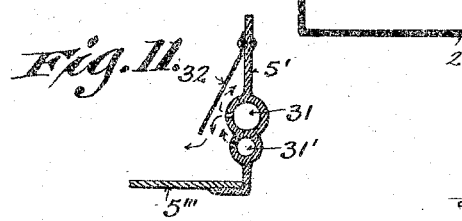

UNITED STATES PATENT OFFICE.

ALBERT J. LINDEMANN AND WALTER C. LINDEMANN, OF MILWAUKEE, WISCONSIN, ASSIGNORS TO A. J. LINDEMANN & HOVERSON CO., OF MILWAUKEE, WISCONSIN.

COOKING-STOVE.

1,191,978.  Specification of Letters Patent.  Patented July 25, 1916.

Application filed December 9, 1914. Serial No. 876,321.

*To all whom it may concern:*

Be it known that we, ALBERT J. LINDEMANN and WALTER C. LINDEMANN, both citizens of the United States, and residents of Milwaukee, in the county of Milwaukee and State of Wisconsin, have invented certain new and useful Improvements in Cooking-Stoves; and we do hereby declare that the following is a full, clear, and exact description thereof.

Our invention refers to that type of combined stove wherein solid fuel and fluid fuel such as gas and oil, etc., are jointly or selectively employed as the heating element, which stoves are utilized for baking and over-fire cooking. Heretofore in the above mentioned type of stove the general practice has been to provide the baking oven with some form of gas-burning appliance positioned directly within the cooking field of the oven bottom, the said appliance to be utilized in supplying the baking heat when the fluid fuel is employed. Such positioned gas burners, when directly set within the oven bottom, are covered by some form of shield or deflector and the appliance as a whole thus interrupts the oven bottom more or less and forms a chamber therein or a series of separate layers or thicknesses. Under these conditions these elements constitute insulators which materially impair uniformity in heating the baking oven when the solid fuel is utilized due to the fact that a large area of the baking field oven bottom is interrupted or isolated from the direct influence of the solid fuel heat with result that a large percentage of the oven bottom cannot be brought to the same high temperature as that portion of the bottom which is unobstructed. Hence the maximum efficiency of the solid fuel heat is not obtained under such conditions and it follows that, owing to the uneven or streaky temperature uniform baking is more or less uncertain and frequently results in an article being partly baked at one point, while it is overbaked or burnt at another.

Furthermore, the gas burners usually employed for ovens of the type mentioned are provided with removable knockdown or removable parts which must be assembled or dismantled or mechanically operated with each change of fuel, with the result that parts are frequently misplaced or broken and the transformation necessary also requires more or less skill not usually found among those operating such ovens. In our experience, both in an experimental and practical application of combination stoves, as manufacturers, we have found it to be a fact that stove ovens equipped with burners in direct communication with the oven as above stated, demonstrate a certain efficiency when the gas is utilized as a baking fuel, but the efficiency is materially impaired when the solid fuel is utilized.

Hence the primary object of our invention is to provide a simple, economical and efficient stove of the type referred to wherein the objectionable features enumerated above are overcome. Thus, for example, our improved oven has no movable parts and consequently requires no changes in conversion of fuel and is therefore ready at all times, there being no mechanical parts or apparatus within the oven proper to become disarranged, deteriorate or be affected by expansion and contraction.

Specific objects of our invention are:

To provide a combination stove of the character described having a burner equipment within the oven, the bottom of which oven is unobstructed by said burner equipment, whereby the entire cooking field of the oven is available and is uniformly heated, irrespective of the selective fuel used.

To provide a liquid fuel equipment within the oven, beyond the cooking field, having a suitable deflector associated therewith.

To provide a direct fluid fuel supply equipment fixed within the oven near its lower corner comprising a burner, a deflector therefor and, under certain conditions, the equipment also includes a damper or valve-controlled secondary air supply and a damper or valve-controlled oven vent.

To provide the oven vent and secondary air supply means under certain conditions, with valves having a single controlling means that is outside of the oven, the said single controlling means for the valves being equipped with visual indices to show the shift from solid to gaseous fuel as the cooking medium.

To provide a permanently fixed gas supply means near the lower sides or bottom corner of the oven to render the entire cooking field of the oven clear of obstructions for supplying direct and reflected heat to the oven chamber.

To provide a permanently fixed burner equipment near the bottom corner of the oven, whereby the side walls and bottom of said oven may constitute burner deflectors.

To provide the oven, under certain conditions, with offset portions near its bottom for the reception of a gaseous fuel supply means, whereby said offsets constitute heat deflectors for the burners in conjunction with other deflector means for directing the heat units uniformly toward the center of the unobstructed oven bottom. Thus both the central portion of the oven bottom and outer borders of the same are sensitive to the influence of the indirect heat when solid fuel is used.

To provide an oven body, the inner and outer surfaces of the bottom of which body are unobstructed with permanently fixed fuel supply means affixed adjacent to its edges.

To provide an oven jacket, certain sections of the walls of which form gas supply elements.

To provide an oven of the character described, the lower corners of which are offset and provided with gas burners having discharge vents that lead both upwardly and downwardly directed against the juxtaposed surfaces of the offset oven wall and bottom, whereby the same constitute deflector means for the burners.

To provide within the oven a fixed fluid fuel supply means offset from and near the oven bottom embodying a burner, a valve-controlled air supply duct therefor, a valve-controlled oven vent, and a single manually controlled means outside of the stove whereby the air duct and oven vent are actuated. Hence, when changing from gas to solid fuel manipulation of the common valve actuating means is the only manual operation necessary.

With the above and other objects in view the invention consists in certain peculiarities of construction and combination of parts as set forth hereinafter with reference to the accompanying drawings and subsequently claimed.

In the drawings: Figure 1 represents a longitudinal sectional view of a combined solid fuel and fluid fuel burning stove in connection with our invention, the section being indicated by line 1—1 of Figs. 2 and 3; Fig. 2, a sectional plan view of the same, the section being indicated by lines 2—2 of Figs. 1 and 3; Fig. 3, a transverse sectional view of the stove, the section being indicated by lines 3—3 of Figs. 1 and 2; Fig. 4, a detailed sectional view of a fragment of the back portion of the oven illustrating a system of valve-actuating mechanism, the section being indicated by line 4—4 of Fig. 2; Fig. 5, a detailed face view showing the single valve actuating lever in connection with a fragment of the stove front, the said lever being shifted to open or close the valve and indicating its position when solid or fluid fuel is utilized, the face of the stove oven being provided with the words "Gas" and "Coal" associated with the pointer lever; Fig. 6 illustrates a longitudinal sectional view of a combined solid fuel and gas burning stove exemplifying another form of our invention; Figs. 7 to 9 inclusive illustrate detailed sectional views through a corner of an oven showing certain other forms of our invention; Fig. 10, a diagrammatic plan sectional view of an oven embodying the features of our invention, the burner being in the form of a loop positioned centrally of the oven sides and in juxtaposition to the oven bottom but clear from the cooking field having deflector means associated with the burner, which deflector means is indicated in dotted lines, and Fig. 11 illustrates still another form of our invention wherein the oven walls are formed from cast metal plates having burner cavities and secondary air cavities cored therein.

Referring by characters to the drawings, 1 represents a stove base upon which is mounted the stove body comprising the usual front and back walls 2, 2', respectively, connected by side walls 3, 3', all of which walls, as shown, are formed from metal sheets having an interlining of asbestos or other suitable insulating material. The front wall is provided with the usual aperture and closure in the form of a door 4, whereby access is had to an oven chamber. The oven side walls 5, 5', are formed from single thicknesses of sheet metal which extend transversely of the stove and are connected at the front and rear respectively to the back and front body walls 2 and 2'. The oven side wall 5 extends down to and is secured to a stove bottom 6, whereby a solid fuel compartment 7 is formed at one end of the stove, which compartment is provided with the usual ashpit and grated fuel magazine 7'. The upper ends of the side walls of the oven are connected by a roof sheet 5" and the said side walls are also connected by a bottom sheet 5''', which bottom sheet is clear of obstructions and is spaced from the oven bottom 6 to form a solid fuel flue space below said oven bottom, there being the usual transversely disposed baffle-plate 9 connecting the oven bottom and stove bottom 6, whereby the heat and gases are properly diffused about the oven bottom before passing through a smoke flue aperture 10 which is formed in the rear oven wall 2' and incased by a smoke booth 9' which terminates at a point approximately upon the plane of the top of the stove for the reception of a smoke-pipe as shown. The rear wall 2' of the oven is also provided with a direct flue aperture 10' which communicates with the smoke boot under suitable damper control. The stove top 11, as shown, is formed with the usual lid-closed apertures and is depressed at one end and extended beyond the side wall 3' of the oven proper to form a housing for suitable gas burner heads 12 having a grid 12' fitted thereabove, whereby the oven top proper is upon a common plane. When solid fuel is employed for baking purposes, it is obvious that the damper-controlled aperture 10' is closed, whereby said gases are caused to travel through the flue space between the top of the oven and the stove top proper and from thence rearward and downwardly between the side wall of the oven 5' and the side wall of the stove 3', from which point they are caused to travel under the bottom of the oven in a circuitous route to the vent aperture 10, from which point they are carried off in the usual manner by the smoke flue, it being observed that the partition 9 is provided for causing the hot gases to be thrown forward whereby the oven bottom will be subjected to the full heating influence preparatory to the products of combustion being permitted to escape through the smoke boot.

The side walls of the oven body, as previously mentioned, are also provided with the usual sets of rails 13 for the reception of interchangeable or removable racks 13' for convenience in cooking. In addition to the sheet metal construction described above, our invention is applicable and equally efficient in connection with stoves of the standard cast iron construction, in which construction the walls of the stove as well as the walls of the oven are formed from plates of cast metal. All of the mechanism described heretofore forms no part of our present invention, with the exception that it shows a practical construction of stove for utilizing coal or other solid fuel as a heating medium and, as previously stated, our invention, in this instance, relates to the means for supplying the fluid fuel heating element for the baking oven, whereby the greatest efficiency and economy in results and construction is obtained.

Referring especially to Figs. 1 to 5 inclusive, the lower corners of the oven side walls 5 and 5' are provided with outwardly offset deflector compartments A, which compartments are formed by transversely extended side wall sections a that are suitably secured to the side walls sheets 5 and 5' and to the oven bottom sheet 5'''. Thus said oven bottom sheet is of slightly greater width than the oven proper. The lower ends of the side wall sheets 5, 5', proper are extended downwardly below the top wall of the offset chambers to form aprons or deflectors b, which deflectors are slightly inclined inwardly and terminate a predetermined distance from the bottom sheet of the oven. These deflectors, as shown, are also provided with a series of hot air discharge vents b' at their point of intersection with the upper portion of the sheet sections a. 14' indicates a gas main which is under valve-control and communicates with a supply pipe 15, which pipe extends backwardly and rearwardly of the stove having branch burner pipes 16, 16', that project through apertures in the rear wall 2' and extend into the burner compartments A of the oven adjacent to its opposite corners, which corners intersect the oven bottom 5'''. These pipes 16 and 16' constitute longitudinally disposed gas burners which, in this exemplification of our invention, are provided with a series of upwardly discharging burner vents 17 and a second series of horizontally disposed burner vents 17', the latter being adapted to discharge toward the center of the oven bottom. The longitudinally disposed burners are shown provided with supporting feet 18 which rest upon the bottom of the oven, but it is understood that these supports may be dispensed with in some instances and said burners may be suspended clear of the floor and side walls. The ends of the burners are provided with suitable cap closures 16'', whereby gas entering the pipes will be discharged in a series of jets, as indicated in Fig. 2 and by the arrows in Fig. 1, through the hot air vents b' and between the lower edges of the deflectors b and the bottom of the oven. Thus it is apparent that the burners are positioned outside of the cooking field of the oven adjacent to its bottom and that said oven may be heated by these burners both directly and indirectly owing to the deflector construction associated therewith, in which deflector construction the aprons b co-act with the walls of the offset sections a, a' of the burner compartments.

The primary air for the burners is admitted in the usual manner to the main gas supply pipe 15 and, in order to provide oxygen for proper combustion within the oven, we provide secondary air ducts 19, 19', which ducts incase a series of air inlet apertures 19'' that are formed in the wall sections a. The said air inlet apertures are suitably graded and spaced to admit air in desired quantities to the burner discharge vents, as, for example, they may, in some instances, be positioned directly in alinement with the series of said burner vents to supply each of the same individually or they may be of lesser number and of proportionately greater area, all of which construction is within the knowledge of those skilled in the art.

The air ducts as shown, are formed by plates riveted to the exterior of the wall sections a and are preferably flared outwardly from front to rear to form air channels for the entire series of air inlet apertures in correct proportions, whereby the distribution will be equal throughout the length of the burner. Attention is also called to the fact that, by this construction, the flue passage for products of combustion between the flared wall of the duct 19' and the juxtaposed side wall 3' of the oven is correspondingly restricted at the rear portion of said oven and increased at the forward or front portion of said oven, whereby tendency of the gases in traveling about the oven to escape through the smoke boot will, by the choke-bore effect, have a tendency to flow forwardly and thus evenly distribute the heat about the bottom wall of said oven and especially toward the front, which result is usually difficult to obtain under the ordinary method of construction for solid fuel stoves. In this exemplification of our invention the rear end of each air duct is flared outwardly to form a valve-casing 20, into which casings air inlet ports 21 communicate. The ports have fitted thereover suitable grids 21' for the reception of plates constituting slide valves 22, 22'. The slide valve plate 22', as best shown in Fig. 4, is provided with a nib 23, which nib is engaged by a spanner arm 23' that projects through a slot in the lower wall of the air duct and is rigidly mounted upon a rod 24. This rod is suitably journaled and extends forwardly through the front wall 2 of the oven and has secured to its outer end a lever 25 having a pointer extension 25', which indicates the position of the valve damper as, for example, if the damper is closed, the indicator finger will point to the word "Coal" upon the outer face of the oven and if open to the word "Gas", as best shown in Fig. 5. Under usual conditions the oven chamber must be vented when gas within the oven is utilized as a fuel and, in order to accomplish proper ventilation, the rear wall 2' which also constitutes the rear wall of the oven proper, is formed with a vent flue 26, which vent flue communicates with the smoke boot 9'. The vent flue is, in this exemplification of our invention, positioned near the bottom of the oven, but it should be understood that the same may be otherwise located without departing from the spirit of our invention. The said vent flue, as shown is fitted with a gridded bracket 27, having guides for a correspondingly gridded valve member 27', the opposite ends of which are respectively connected to the slide valves 22, 22', which control the burner air ducts 19, 19', by tie-rods 28, the said tie-rods being extended through apertures of the oven side wall sections a, as best shown in Fig. 4. By this valve connection it will be observed that when the single lever 25 at the front of the stove is manipulated in one direction, both the secondary air ducts and oven vent flue 26 will be closed, whereby the oven is practically sealed for the purpose of using coal or other solid combustible substance as a fuel and when it is desired to utilize fluid fuel or gas for baking purposes within the oven, the lever 25 is simply moved in the opposite direction to indicate "Gas", thus opening the required vent aperture and secondary air supply ducts, whereby perfect combustion and ventilation is obtained within the oven.

It will be further observed that the burners are offset from the baking field of the oven bottom and that said oven bottom both upon its inner and outer surface, is clear of any obstructions whereby the solid fuel heat can flow uniformly over the oven bottom exterior surface and thus indirectly heat the said oven compartment uniformly. It will also be observed that great economy is effected due to the fact that the gas burners are permanently fixed within the oven, whereby no skill is required in manipulating the stove for conversion from one fuel to another and, owing to the position of the gas burners, the heat units are utilized to a maximum degree both for direct and indirect radiation, the sides, bottom and deflector means being all employed to produce the desired results, the generic idea of our invention being the arrangement of a burner or burners situated at or near the lower corners of the oven or beyond the cooking field thereof, whereby said field is entirely unobstructed and the full capacity of the oven is utilized to thus insure the maximum utility of all heat units produced and the maximum utility of the oven body as a heat absorbing medium irrespective of the type of fuel employed.

Our invention may be carried out in various forms as, for example, referring to Fig. 6, the lower corners of the stove oven in this instance are not provided with side offset deflecting chambers, the side plates 5 and 5' being uninterrupted. The burner mechanism, in this exemplification of our invention, is practically of the same construction as that shown in connection with Figs. 1 to 5 inclusive of the drawings, the said burners being positioned in the lower corners. The oven side walls 5 and 5' have permanently secured thereto deflector plates b'', which plates extend obliquely from the side walls and terminate a predetermined distance from the bottom plate 5''', whereby a lower vent or gas passage is formed for the burners which are partly incased by the deflectors. Each of the deflectors is provided with an upper row of hot air vents b'''. The side walls of the oven in this instance between the point of deflector connection and bottom of the oven, is formed with a plurality of air inlet apertures 19'', which communicate with the air ducts 19'. Thus it will be observed that the oven in this instance is not offset at its bottom corners but owing to the restricted dimensions of the burner mechanism taken in conjunction with the deflectors, the said oven bottom is, to all practical purposes free of any obstructions whereby baking utensils or the like of maximum capacity can be utilized. The double rows of gas discharge apertures formed in the burners in this instance will thus cause a series of flames to be thrown upwardly, whereby the heat is discharged through the upper series of deflector vents, while the lower row of burner apertures will discharge heat between the end of the deflector and bottom of the oven toward its center, as indicated by the arrows, the burners being capable of giving off both direct and reflected heat toward the center of the oven and throughout its entire area.

Fig. 7 illustrates a construction of oven corner wherein the lower section of the side wall is formed from a casting or stamping 29, having therein a burner cavity 29' with one or two series of gas discharge vents 29'''. The casting or stamping constituting part of the side wall is slightly bowed outwardly so as to effectually clear the baking field of the oven and the upper bowed portion of said side wall also constitutes a deflector surface. The lower portion 30 of the side wall 5' to which the stamping is attached is, in this instance, stopped off a predetermined distance from the oven bottom 5''', to thus form a deflector having vent holes 30' at its point of intersection with the stamping. It is understood, however, that, in some instances, the upper vent holes in the burner deflectors may be dispensed with or vice versa. The burner cavity of the stamping or casting 29 is connected in any suitable manner to a source of gas supply and in order to provide secondary air, a duct 31 is formed about the burner cavity having air vent apertures 31' which supply oxygen to the burner flames in the desired quantity.

Fig. 8 illustrates the lower bottom corner of an oven which is offset to form a curved upper deflector wall 35, under which is positioned the burner, which burner, in this instance, is partly incased by a deflector apron but the offset curved upper wall 32 forms a deflector surface against which a series of jet flames are directed, while the second series of burner flames are discharged toward the center of the oven and against the bottom 5''', whereby direct and radiated heat is utilized. In this type of burner mechanism the secondary air is admitted within the field of the burner jets from an air duct 31' by means of suitable apertures.

Fig. 9 illustrates still another form of our invention wherein the lower portion of the side wall 5' is formed with upper and lower series of hot air vent apertures 33, 33', which are adapted to discharge into the body of the oven and in this instance the lower corner of the oven is fitted with an exterior curvilinear deflector jacket 34, which deflector jacket also constitutes a chamber for the reception of the burner head. The said deflector jacket is also provided with a secondary air duct 34', whereby the proper amount of oxygen for perfect combustion is admitted to the burner head. In this case the jet flames from the burner are discharged upon the juxtaposed surfaces of the deflector jacket and lower portion of the oven side wall and the heat generated is caused to travel through the upper and lower hot air vents 33, 33', it being understood that, while we have shown the lower series of vents 33' in the form of apertures, we may, without departing from the spirit of our invention, stop off the side-plate 5' to form a continuous slot between its edge and the oven bottom. In either case the lower section of side wall will form a deflector apron.

Fig. 10 illustrates a diagrammatic plan view of an oven jacket having central offsets B, which offsets are at or near the oven bottom. The said offsets may be suitably curved or formed in any desired manner so as to produce the desired reflecting elements and are adapted to contain burner heads C which are outside of the baking field of the oven. The said burner heads are connected up in any suitable manner by pipes, as shown, and a source of liquid fuel supply. Between the exposed burners C and the oven proper there may be positioned suitable deflector aprons 34 such as indicated by dotted lines. Thus it will be seen that in all of the forms showing our invention the liquid fuel supply means is associated with the lower corners of said oven and beyond the baking field thereof. It is also understood that under certain conditions where the fuel gas does not require secondary air, the means for supplying this element may be dispensed with.

Various modifications, other than those shown to exemplify our invention, may be made without departing from the spirit of the same. It is apparent that, while we have shown several forms of burner heads having two sets of gas discharge apertures, one set of such apertures may be employed, or any type of burner other than those illustrated may be used in connection with our invention.

Although the various preferred structures herein described have been shown as embodying a tubular gas burner of a conventional type used in gas ovens, it is within the conception of the present invention to utilize other heating structures in view of the fact that the deflector plates, or baffle plates, as they may as well be termed, form the inner walls of the burner chambers, the outer walls of which are formed by the adjacent wall portions and any combustion means may be employed in these burner chambers, such as a blast burner, and in this structure the deflector or baffle plate would serve to retain the flames in the chamber in addition to their normal function of supplying heat by radiation.

Referring to Fig. 11, a construction is illustrated wherein the oven body is formed from cast metal plates. The side wall illustrated shows a cast metal plate 5' having a burner cavity 31 therein and a secondary air cavity 31' vented to supply the proper amount of air to the burner. This construction also contemplates utilizing a deflector plate 32, as shown. The cast metal form of oven wall illustrated is provided with a cast metal bottom plate 5''' and, in this example, of our invention, the burner mechanism, which is integral with the wall is shown in vertical alinement therewith as distinguished from that form of our invention illustrated in Fig. 7.

We claim:

1. In a combined solid and fluid fuel stove, an oven, including a single unobstructed bottom plate, a fluid fuel burner disposed within the oven adjacent a bottom edge portion thereof, and a baffle plate secured to the adjacent side of the oven above the burner and extending downwardly between said burner and the intermediate portion of the oven.

2. In a combined solid and fluid fuel stove, an oven, the lower edge portion of one side of the oven being outwardly offset, a burner in said offset portion, and a downwardly extending baffle plate secured to said side wall and extending past said offset.

3. In a combined solid and fluid fuel stove, an oven, a burner disposed in a lower edge portion of the oven, a baffle plate secured to the adjacent side wall and extending diagonally inward, and said baffle plate terminating short of the floor, of the oven, and being provided in its upper edge portion with apertures.

4. In a combined solid and fluid fuel stove, an oven having the lower portion of one side provided with a series of air passages, a burner disposed adjacent said air passages, an air supply duct communicating with the air passages and a valve for closing the duct.

5. In a combined solid and fluid fuel stove, an oven having the lower portion of one side provided with a series of air passages, a burner disposed adjacent said air passage, an air supply duct communicating with all of the air passages and taperingly enlarged toward one end and a valve at said enlarged end for closing the duct.

6. In a combined solid and fluid fuel stove, an oven, an outlet vent for the oven, a burner disposed within the oven, a duct for supplying secondary air to the burner, valves for closing the duct and vent and a common actuating means for the valves.

7. In a combined solid and fluid fuel stove, an oven provided in its rear portion with an opening, burners disposed along the bottom side edge portions of the oven, and disposed therewithin, ducts disposed adjacent the oven sides and communicating therewith for supplying secondary air to the burners, respective valve plates associated with the oven aperture and the ducts, for closing the same, links connecting the valve plates and means for reciprocating one of said plates.

8. In a combined solid and fluid fuel stove, an oven provided in its rear portion with an opening, burners disposed along the bottom side edge portions of the oven, and disposed therewithin, ducts disposed adjacent the oven sides and communicating therewith for supplying secondary air to the burners, respective valve plates associated with the oven aperture and the ducts, for closing the same, links connecting the valve plates, a shaft passed transversely through the stove, a handle on one end of the shaft, outwardly of the stove and an arm on the other end of the shaft slidably pivoted to one of the valve plates.

9. In a combined solid and fluid fuel stove, an oven, a burner disposed in the oven adjacent a bottom edge portion thereof, a baffle plate secured to the adjacent side of the oven and extending diagonally inward and downward past the burner, and air inlet ports formed in the side of the oven above the axis of the burner.

10. In a combined solid and fluid fuel stove, an oven, a burner disposed in one edge portion thereof, a plate disposed adjacent the burner and forming a burner chamber with the adjacent wall portions thereof, said burner chamber having communication with the oven interior adjacent its top and bottom edges and said burner being provided with a plurality of series of apertures each adapted to discharge flames against the plate adjacent one of said edge portions thereof.

In testimony that we claim the foregoing we have hereunto set our hands, at Milwaukee, in the county of Milwaukee and State of Wisconsin, in the presence of two witnesses.

ALBERT J. LINDEMANN.
WALTER C. LINDEMANN.

Witnesses:
  GEO. W. YOUNG,
  M. E. DOWNEY.